United States Patent [19]

Tamura

[11] 3,843,749

[45] Oct. 22, 1974

[54] METHOD OF MANUFACTURING ACRYLONITRILE POLYMER

[75] Inventor: Hitoshi Tamura, Otake, Japan

[73] Assignee: Mitsubishi Rayon Company, Limited, Tokyo, Japan

[22] Filed: June 12, 1973

[21] Appl. No.: 369,293

[30] Foreign Application Priority Data

Nov. 9, 1972   Japan.............................. 47-112410

[52] U.S. Cl.. 260/78.5 R, 260/79.3 M, 260/85.5 R, 260/88.7 R
[51] Int. Cl....... C08f 3/76, C08f 15/02, C08f 15/22
[58] Field of Search..... 360/88.7 R, 88.7 D, 85.5 R, 360/85.5 D, 85.5 N, 78.5 R

[56] References Cited
UNITED STATES PATENTS 3,141,869   7/1964   Dennstedy..................... 260/85.5 L
3,213,069   10/1965   Rausch ......................... 260/85.5 N

OTHER PUBLICATIONS

Schnecko, Chem. Abs., 59, pp. 10,241f (1963).
Chem. Abs., 62, pp. 5,411c (1965).

Primary Examiner—Harry Wong, Jr.
Attorney, Agent, or Firm—Oblon, Fisher, Spivak, McClelland & Maier

[57] ABSTRACT

Acrylonitrile polymer having excellent whiteness and resistance to thermal coloration is prepared by polymerizing acrylonitrile or a mixture of at least 85 percent by weight of acrylonitrile and the balance of an ethylenically unsaturated monomer capable of copolymerizing with acrylonitrile in an aqueous medium containing a catalyst comprising nitrous acid or its salt and a water-soluble sulfoxy reducing compound and at least $10^2$ p.p.m. of a chelating agent.

9 Claims, No Drawings

METHOD OF MANUFACTURING ACRYLONITRILE POLYMER

FIELD OF THE INVENTION

The present invention relates to a method of manufacturing acrylonitrile polymer, particularly, and relates to a method of manufacturing acrylonitrile polymer containing at least 85 percent by weight of polymerized acrylonitrile and having excellent whiteness and stability to thermal coloration.

DESCRIPTION OF THE PRIOR ART

It is well-known that there are various catalysts for producing the acrylonitrile polymers. The catalysts include substances which themselves have the ability of initiating the polymerization, or compositions consisting of two or more substances which are catalytic to the polymerization. Particularly, it is known that the so-called redox catalysts are effective for the production of the acrylonitrile polymers.

As is widely known, acrylonitrile fibers are required to have excellent or high whiteness and high stability to thermal coloration. These properties depend on the properties of the acrylonitrile polymer used for preparing the fibers. Accordingly, in order to prepare acrylonitrile fiber having excellent whiteness and thermal stability, it is necessary that the acrylonitrile polymer to be converted to the fiber has excellent whiteness and high thermal stability.

Also, it is widely known that the whiteness and the thermal stability of the acrylonitrile polymers depend primarily on the kind of catalyst and the polymerization conditions. Further, it is known that the whiteness and thermal stability of the acrylonitrile polymers are affected by heavy metal ions contained in the aqueous polymerization medium as impurities. That is, in the industrial polymerization process for acrylonitrile, there are many occasions in which the aqueous polymerization medium is contaminated by the heavy metal ions derived from impurities of catalyst, industrial water, monomer or monomers to be polymerized, material used for the polymerization apparatus and additional chemicals. The contamination of the aqueous medium by the heavy metal ions results in a large decrease in whiteness and thermal stability of the resultant acrylonitrile polymers.

The heavy metal ions contained in the aqueous medium can be altered into a non-active form by adding a chelating agent into the aqueous medium. However, in the conventional polymerization for acrylonitrile in the presence of the redox catalyst, it is believed that the chelating agent acts as a polymerization inhibitor.

For example, the polymerization of acrylonitrile can be effected by using a typical catalyst comprising a persulfate as the oxidizing agent and a sulfite as the reducing agent in the aqueous medium. In this case, even if the aqueous medium contains ethylenediamine tetraacetic acid which is a typical chelating agent in a small amount of 10 p.p.m., the chelating agent greatly inhibit the polymerization.

Accordingly, it is believed in general that the chelating agent in the aqueous medium should be limited to such a very small amount that the polymerization is practically not inhibited.

Japanese Patent Publication No. 13546/1961, discloses a method of polymerizing acrylonitrile in the presence of the redox catalyst in an aqueous medium, in which method $10^{-2}$ to $10^2$ p.p.m. of a chelating agent is added to the aqueous medium. However, such a small amount of the chelating agent, of course, results in insufficient seizing of the heavy metal ions in the aqueous medium. The insufficient seizing causes low whiteness and thermal stability of the resultant acrylonitrile polymer.

SUMMARY OF THE INVENTION

The object of the present invention is to provide a method of manufacturing acrylonitrile polymer in an aqueous medium in the presence of a redox catalyst without decrease in yield.

The object as stated above can be accomplished by the method of the present invention.

During their study it was observed by the present inventor that the use of a chelating agent in an aqueous medium will not act as a polymerization inhibitor when a redox catalyst of nitrous acid or its salt and a water-soluble reducing compound is used. This was observed even when the chelating compound was used in amounts as large as of 100 p.p.m. or more, for example, in a range of 100 to 500 p.p.m.. It was found that chelating agent will inhibit polymerization, however, when a redox catalyst of persulfate and the sulfite are used. That is, in the former case, the chelating agent does not affect the yield of the resultant acrylonitrile polymer. In this connection, it was further observed that the resultant acrylonitrile polymer has an excellent whiteness and thermal stability.

According to the methods of this invention acrylonitrile polymers having excellent whiteness and thermal stability are polymerized, in an aqueous medium. The acrylonitrile polymerization mixture should contain at least 85 percent by weight of acrylonitrile and the balance at least one ethylenically unsaturated monomer capable of copolymerizing with acrylonitrile. The polymerization catalyst comprises nitrous acid or a salt thereof and a water-soluble sulfoxy reducing compound. The improvement of this invention resides in that at least $10^2$ p.p.m. of a chelating agent is added to the aqueous medium.

DETAILED DESCRIPTION OF THIS INVENTION

In the methods of this invention, the polymerization of acrylonitrile or the mixture of acrylonitrile and the ethylenically unsaturated monomer is effected in the presence of a polymerization catalyst comprising nitrous acid or its salt as the oxidizing agent and a water-soluble sulfoxy reducing compound as the reducing agent. Such redox catalyst is known by the Japanese Patent Publication No. 2439/1959.

The oxidizing agent usable for the catalyst of the present invention is selected from nitrous acid and its salts, for example, sodium nitrite, potassium nitrite, ammonium nitrite, calcium nitrite and magnesium nitrite.

The reducing agent usable for the catalyst of the present invention is selected from the water-soluble sulfoxy reducing compounds which include sulfurous acid; sulfites, hyposulfites, bisulfites, metasulfites, metabisulfites, and mixtures of two or more of the above-mentioned compounds. As the salt, sodium, potassium, ammonium, calcium, or magnesium salt is used.

The catalysts usable for the method of the present invention may be combinations of a hydroxylamine sulfonic acid or its salts which is easily prepared from nitrous acid or its salts and sulfurous acid or its salts with sulfurous acid or its salts.

The chelating agent usable for the method of the present invention may be selected from ethylenediamine tetraacetic acid, nitrilotriacetic acid, 1,2-cyclohexanediamine tetraacetic acid, diethylenetriamine pentaacetic acid and water-soluble salts of the above acids.

The chelating agent is added in an amount of at least $10^2$ p.p.m., preferably, from 100 to 500 p.p.m., into the aqueous medium in response to the content of the heavy metal ion in the aqueous medium. If the amount of the chelating agent is less than 100 p.p.m., it is difficult to completely seize the heavy metal ions in the aqueous medium.

As stated hereinbefore, it is important that in the method of the present invention using the catalyst comprising nitrous acid or its salt and a water-soluble sulfoxy reducing compound; the chelating agent does not affect the yield of the polymerization product. The reasons for the behaviour of the chelating agent is not clear at the present time, but it is assumed to be as follows. In the polymerization of acrylonitrile using a catalyst comprising a persulfate and a sulfite, the heavy metal ions in the aqueous medium probably activate the catalyst. Accordingly, when the heavy metal ions are seized by the chelating agent, the activation of the catalyst is probably inhibited. Compared with this, a catalyst of nitrous acid or a salt thereof and a water-soluble sulfoxy compound will not be significantly affected by the heavy metal ions in the aqueous medium. Accordingly, even if the heavy metal ions are completely seized by the chelating agent, the catalyst can sufficiently act to initiate and promote the polymerization of acrylonitrile.

It is known that the heavy metal ion, for instance iron ion or copper ion in the aqueous medium causes yellowing and low thermal stability of the resultant acrylonitrile polymer. However, even if the aqueous medium contains, for example, 10 p.p.m. of iron ion, the addition of, for example, 200 p.p.m. of ethylenediamine tetraacetic acid can prevent the undesirable coloring effect of the iron ion and can result in an acrylonitrile polymer having excellent whiteness and thermal stability. In this case, it should be noted that the addition of the chelating agent does not significantly affect the polymerization yield, polymerization rate, or degree of the polymerization of the resultant polymer. Accordingly, in the method of the present invention, the chelating agent may be added to the aqueous medium of the polymerization system in an optional amount, for example, from 100 to 500 p.p.m. Additionally, the methods of the present invention have the advantage that severe inspection and control of the undesirable heavy metal ions derived from polymerization materials, additional chemicals, water used, and materials of the polymerization apparatus is not necessary; whereas in the conventional methods it is necessary to closely inspect and control the polymerization materials for heavy metal ions.

According to the methods of the present invention, the monomer or monomers to be polymerized, the catalyst and, if necessary, the controlling agent and the additional agent are added into water, and the water is adjusted to a pH of 1.5 to 5.0, preferably, 2 to 5.0, in accordance with conventional method. A desired amount of the chelating agent is further added to the aqueous medium and, thereafter, the mixture is subjected to polymerization in a polymerization vessel at a temperature of from 30° to 70°C under closed conditions or while an inert gas or air is passed through the polymerization vessel.

In this connection, it is important to add the chelating agent to the aqueous medium before the initiation of the polymerization in either a batch system polymerization or a continuous system polymerization. Particularly, in the continuous polymerization, it is necessary to add the chelating agent to the liquid to be supplied to the polymerization. If the chelating agent is added after initiating or completing the polymerization, no effect in seizing the heavy metal ions results.

The methods of the present invention are suitable for the polymerization of acrylonitrile alone or a mixture of at least 85 percent by weight of acrylonitrile and the balance of one or more ethylenically unsaturated monomer capable of copolymerizing with acrylonitrile. The ethylenically unsaturated monomer may be a vinyl compound, for example, vinyl acetate, vinyl chloride, vinylidene chloride, acrylic acid, methacrylic acid, acrylic esters, methacrylic esters, styrene, vinyl succinoimide, acrylic amide, vinyl pyridine and crotonic acid, or other copolymerizable compound such as sulfophenyl methallyl ether or anhydrous maleic acid.

In the methods of the present invention, the ratio by weight of the monomer or monomers to water is preferably in a range of 1/10 to ⅓, more preferably 1/7 to 1/5. The ratio by weight of nitrous acid or its salt to the water-soluble sulfoxy reducing compound is preferably in a range of 1/30 to ⅓, more preferably, 1/10 to 1/5. Further, the ratio by weight of the water-soluble sulfoxy reducing compound to water is preferably in a range of 1/300 to 1/50, more preferably, 1/300 to 1/100.

Various methods of practicing the present invention are illustrated by the following examples which are intended merely to illustrate the present invention and not in any sense to limit the scope of the present invention.

EXAMPLES 1 AND 2

A catalyst mixture of 0.6 part by weight of sodium nitrite and 6 parts by weight of sodium metabisulfite was dissolved in 700 parts by weight of water containing 10 p.p.m. of iron ion in a polymerization vessel. To the solution was added disodium ethylene diamine tetraacetate ($C_{10}H_{14}N_2Na_2O_8 \cdot 2H_2O$) in an amount of 200 p.p.m. with respect to the volume of the solution. The solution was adjusted to a pH of 2.5 by adding a small amount of sulfuric acid.

A mixture of 94 parts by weight of acrylonitrile and 6 parts by weight of methyl acrylate was added into the solution at a constant addition rate within 80 minutes, and polymerized at a temperature of 55°C for 4 hours with stirring while flowing air through the polymerization vessel.

After completing the polymerization, the resultant copolymer was washed with a large amount of water and dried. Yield of the copolymer was determined, and reducing viscosity of the copolymer was measured at a concentration of 0.2 g/100 cc of dimethyl formamide at a temperature of 25°C. Further, the resistance of the copolymer against thermal decomposition was measured by a method that 10 percent solution of the copolymer in dimethylformamide was prepared, the solution was heated at 90°C for 90 minutes, and absorbances of the heated solution at 430 and 460 mµ were measured.

The same procedures as stated above were repeated using 100 p.p.m. (Example 2) of the sodium ethylenediamine tetraacetate.

Further, for comparison, the same procedure as those stated above were repeated using 50 p.p.m. of (Comparison Example 1) and no (Comparison Example 2) disodium ethylenediamine tetraacetate. The results are shown in Table 1.

Table 1

| Example | Concentration of EDTA (*) (p.p.m.) | Yield (%) | Reducing viscosity | Absorbance 430 mµ | 460 mµ |
|---|---|---|---|---|---|
| Example 1 | 200 | 92.0 | 1.58 | 0.092 | 0.052 |
| Example 2 | 100 | 91.2 | 1.58 | 0.108 | 0.068 |
| Comparison Example 1 | 50 | 92.0 | 1.52 | 0.182 | 0.121 |
| Comparison Example 2 | 0 | 93.0 | 1.50 | 0.233 | 0.188 |

(*) EDTA: Disodium ethylenediamine tetraacetate

From Table 1, it is clear that the yield of the copolymer and the reducing viscosity are independent on the concentration of the disodium ethylenediamine tetraacetate in the polymerization medium. However, in view of the absorbances in Examples 1 and 2 and Comparison Examples 1 and 2, it is obvious that the larger the concentration of the disodium ethylenediamine tetraacetate in the polymerization medium, the lower the absorbance at 430 and 460 mµ, that is, the higher the whiteness and resistance to thermal chloration. Particularly, the absorbances of the copolymers obtained in Examples 1 and 2 are smaller than those in Comparison Examples 1 and 2. That is, the whiteness and the resistances to thermal coloration of the copolymers prepared in Examples 1 and 2 are higher than those in Comparison Examples 1 and 2.

Further, it should be noted that the copolymer of Example 1 wherein the disodium ethylenediamine tetraacetic acid was used in the larger amount than that of Example 2, has a higher whiteness and resistance to thermal coloration than that of Example 2.

For further comparison, the same procedures as those of Example 1 were repeated using a catalyst consisting of a mixture of 1.14 parts by weight of sodium persulfate and 2.27 parts by weight of sodium sulfite. The polymerization resulted in a small yield of about 30 percent of the acrylonitrile-methyl acrylate copolymer. From this fact, it is evident that the chelating agent can be utilized for the polymerization of acrylonitrile only when the catalyst comprising nitrous acid or its salt and the water-soluble sulfoxy reducing compound is used.

EXAMPLES 3 AND 4

The same procedures as those in Example 1 were repeated except that nitrilotriacetic acid was used instead of the disodium ethylenediamine tetraacetate in amounts of 200 p.p.m. (Example 3) and 100 p.p.m. (Example 4) and water contained 5 p.p.m. of iron ion.

For comparison, the same procedures as stated above were repeated except that the nitrilotriacetic acid was used in amounts of 50 p.p.m. (Comparison Example 3) and zero (Comparison Example 4). The results are shown in Table 2.

Table 2

| Example | Concentration of NTA (*) (p.p.m.) | Yield (%) | Reducing viscosity | Absorbance 430 mµ | 460 mµ |
|---|---|---|---|---|---|
| Example 3 | 200 | 92.1 | 1.55 | 0.093 | 0.054 |
| Example 4 | 100 | 92.3 | 1.54 | 0.110 | 0.068 |
| Comparison Example 3 | 50 | 92.6 | 1.54 | 0.162 | 0.100 |
| Comparison Example 4 | 0 | 93.0 | 1.50 | 0.233 | 0.188 |

(*) NTA: Nitrilotriacetic acid

As Table 2 clearly shows, the yield and reducing viscosity of the resultant copolymers are independent on the concentration of nitrilotriacetic acid in the polymerization medium. However, the absorbance of the copolymers depends on the nitrilotriacetic acid concentration, that is, the larger the concentration of the nitrilotriacetic acid, the higher the whiteness and the resistance to thermal coloration. Particularly, it is evident that the copolymer prepared in the polymerization medium containing 100 p.p.m. or more of the nitrilotriacetic acid had an excellent whiteness and resistance to thermal coloration.

EXAMPLE 5

A polymerization mixture was prepared by adding 91 parts by weight of acrylonitrile and 9 parts by weight of vinyl acetate into a solution of 1 part by weight of sodium hydroxylaminesulfonate and 2.3 parts by weight of sodium metabisulfite in 550 parts by weight of water containing 12 p.p.m. of iron ion and 1 p.p.m. of copper ion. Disodium ethylenediamine tetraacetate in an amount of 200 p.p.m. was added to the polymerization mixture and the mixture was adjusted to a pH of 2.5 by adding a small amount of sulfuric acid.

The polymerization mixture was continuously fed into continuous polymerization vessel and polymerized at a temperature of 55°C with stirring. The polymerization mixture stayed in the polymerization vessel for an average of 8 hours. The resultant copolymer was continuously discharged from the vessel, washed with a large amount of water, dehydrated, dried and crushed. In the initiation of the polymerization, the polymerization vessel was previously charged with water in an amount of one half the volume of the vessel. Sodium hydroxylaminesulfonate and sodium metabisulfite was then dissolved in the water and the solution was adjusted to a pH of 2.5 by adding sulfuric acid, so as to promote the initiation of polymerization.

In the continuous polymerization, the disodium ethylenediamine tetraacetate was supplied into the polymerization mixture by dissolving in water to be fed into the polymerization vessel.

Yield, reducing viscosity, and absorbances at 430 and 460 mμ of the resultant copolymer were determined by the same methods as those of Example 1.

For comparison, the same procedures as those of the present example were repeated except that no disodium ethylenediamine tetraacetate was used (Comparison Example 5).

The results are shown in Table 3.

Table 3

| Example | Concentration of EDTA (*) (p.p.m.) | Yield (%) | Reducing viscosity | Absorbance 430 mμ | Absorbance 460 mμ |
| --- | --- | --- | --- | --- | --- |
| Example 5 | 200 | 93.1 | 1.68 | 0.041 | 0.022 |
| Comparison Example 5 | 0 | 94.5 | 1.59 | 0.199 | 0.160 |

(*) EDTA: Disodium ethylenediamine tetraacetate

From Table 3, it is clear that the yield and reducing viscosity of the copolymer prepared in Example 5 are similar to those in Comparison Example 5, respectively. However, the absorbance of the polymer in Example 5 is smaller than those of Comparison Example 5. That is, it is obvious that the copolymer of Example 5 has an excellent whiteness and resistance to thermal coloration.

Further, the copolymers of Example 5 and Comparison Example 5 were formed into fibers. The fibers produced from the copolymer of Example 5 had a higher whiteness and resistance to thermal coloration than those of Comparison Example 5.

EXAMPLES 6 AND 7

A polymerization mixture was prepared in a polymerization vessel by the following procedures (Example 6).

Sulfurous acid gas was blown into 700 parts by weight of water containing 10 p.p.m. of iron ion until 2 parts by weight of sulfur dioxide was dissolved in water. To the solution was further dissolved 0.6 part by weight of sodium nitrite and 200 p.p.m. of 1,2-cyclohexanediamine tetraacetic acid, and the solution was adjusted to a pH of 2.5 by adding hydrogen sodium carbonate and sulfuric acid. A mixture of 94 parts by weight of acrylonitrile and 6 parts by weight of methyl acrylate was added into the solution at a constant addition rate within 80 minutes, and then polymerized by heating the polymerization mixture at a temperature of 55°C for 4 hours with stirring while flowing air through the polymerization vessel.

So that the polymerization could take place under a normal pressure, the polymerization vessel was connected to the atmosphere through a ventilation pipe surrounded by a cooling jacket through which cooling water flows. The cooling jacket was effective for preventing evaporating away of acrylonitrile, methyl acrylate, and sulfurous acid gas from the polymerization vessel.

The resultant copolymer was washed with a large amount of water and dried.

Yield, reducing viscosity, and absorbances at 430 and 460 mμ of the copolymer were determined by the method as stated in Example 1.

The same procedures as those stated above were repeated using 100 p.p.m. of cyclohexanediamine tetraacetic acid (Example 7).

Further, for comparison, the same procedures as those of Example 6 were repeated except that the cyclohexanediamine tetraacetic acid was used in amounts of 50 p.p.m. and zero.

The results are shown in Table 4.

Table 4

| Example | Concentration of CyDTA (*) (p.p.m.) | Yield (%) | Reducing viscosity | Absorbance 430 mμ | Absorbance 460 mμ |
| --- | --- | --- | --- | --- | --- |
| Example 6 | 200 | 91.6 | 1.55 | 0.123 | 0.081 |
| Example 7 | 100 | 92.1 | 1.50 | 0.122 | 0.081 |
| Comparison Example 6 | 50 | 93.0 | 1.53 | 0.189 | 0.130 |
| Comparison Example 7 | 0 | 95.6 | 1.45 | 0.251 | 0.199 |

(*) CyDTA: Cyclohexanediamine tetraacetic acid.

In view of Table 4, the increase of the amount of cyclohexanediamine tetraacetic acid added to the polymerization mixture results in very small decrease of yield of the copolymer and substantially no variation in reducing viscosity of the copolymer. That is, the cyclohexanediamine tetraacetic acid has substantially no influence on the polymerization as stated above. Further, it is clear that the addition of cyclohexanediamine tetraacetic acid in an amount of 100 p.p.m. or more is very effective for enhancing the whiteness and resistance to thermal coloration.

EXAMPLES 8 AND 9

For example 8, 0.6 part by weight of sodium nitrite and 6 parts by weight of hydrogen sodium sulfite were dissolved in 700 parts by weight of water containing 10 p.p.m. of iron ion in a polymerization vessel. Diethylenetriamine pentaacetic acid in an amount of 200 p.p.m. was added to the solution, and the solution was adjusted to a pH of 2.5 by adding sulfuric acid. 94 Parts by weight of acrylonitrile and 6 parts by weight of methyl acrylate was added to the solution. The polymerization was carried out by the same procedures as those used in Example 1, and the yield, reducing viscosity, and absorbances at 430 and 460 mμ for the resultant copolymer were determined by the same methods as those stated in Example 1. The same procedures as those stated above were repeated except that the diethylenetriamine pentaacetic acid was used in an amount of 100 p.p.m. (Example 9).

For comparison, the same procedures as those in Example 8 were repeated using 50 p.p.m. (Comparison Example 8) of and no (Comparison Example 9) of diethylenetriamine pentaacetic acid.

The results are shown in Table 5.

Table 5

| Example | Concentration of DTPA (*) (p.p.m.) | Yield (%) | Reducing viscosity | Absorbance 430 mμ | Absorbance 460 mμ |
| --- | --- | --- | --- | --- | --- |
| Example 8 | 200 | 93.8 | 1.55 | 0.121 | 0.089 |

Table 5-Continued

| Example | Concentration of DTPA (*) (p.p.m.) | Yield (%) | Reducing viscosity | Absorbance 430 mμ | Absorbance 460 mμ |
|---|---|---|---|---|---|
| Example 9 | 100 | 93.5 | 1.52 | 0.125 | 0.090 |
| Comparison Example 8 | 50 | 92.8 | 1.55 | 0.173 | 0.122 |
| Comparison Example 9 | 0 | 94.8 | 1.43 | 0.258 | 0.203 |

(*) DTPA: Diethylenetriamine pentaacetic acid

From Table 5, it is evident that although the diethylenetriamine pentaacetic acid had substantially no influence to yield and reducing viscosity of the resultant copolymer, it was effective for enhancing whiteness and resistance to thermal coloration in an additional quantity of 100 p.p.m. or more.

Having now fully described the invention, it will be apparent to one of ordinary skill in the art that many changes and modifications can be made thereto without departing from the spirit or scope of the invention as set forth herein.

What I claim is:

1. In the method of manufacturing acrylonitrile polymers having an excellent whiteness and thermal stability by polymerizing, in an aqueous medium, acrylonitrile or a mixture of at least 85 percent by weight of acrylonitrile and the balance of at least one ethylenically unsaturated monomer capable of copolymerizing with acrylonitrile in the presence of a catalyst comprising nitrous acid or its salt and a water-soluble sulfoxy reducing compound, the improvement which comprises conducting the polymerization in the presence of at least $10^2$ p.p.m. of a chelating agent selected from the group consisting of ethylenediamine tetraacetic acid, nitrilotriacetic acid, 1,2-cyclohexanediamine tetracetic acid, diethylenetriamine pentaacetic acid and water soluble salts thereof.

2. The method as claimed in claim 1, wherein said chelating agent is in a concentration of 100 to 500 p.p.m.

3. The method as claimed in claim 1, wherein said polymerization is effected at a pH of 1.5 to 5.0.

4. The method as claimed in claim 1, wherein said polymerization is effected at a temperature of 30 to 70°C.

5. The method as claimed in claim 1, wherein the ratio by weight of said nitrous acid or its salt to said water-soluble sulfoxy reducing compound is in a range from 1/30 to ⅓.

6. The method as claimed in claim 1, wherein the ratio by weight of said water-soluble sulfoxy reducing compound to water is in a range from 1/1000 to 1/50.

7. The method as claimed in claim 1, wherein the ratio by weight of said monomer or monomers to water is in a range from 1/10 to ⅓.

8. The method as claimed in claim 1, wherein the nitrous acid or salt thereof is selected from the group consisting of sodium nitrite, potassium nitrite, ammonium nitrite, calcium nitrite and magnesium nitrite; and the water soluble sulfoxy reducing compound is selected from the group consisting of sulfurous acid, sulfites, hyposulfites, bisulfites, metasulfites, metabisulfites, and mixtures thereof.

9. The method as claimed in claim 1, wherein the ethylenically unsaturated monomer capable of copolymerizing with acrylonitrile is selected from the group consisting of vinyl acetate, vinyl chloride, vinylidene chloride, acrylic acid, methacrylic acid, acrylic esters, methacrylic esters, styrene, vinyl succinoimide, acrylic amide, vinyl pyridine, crotonic acid, sulfophenyl methallyl ether and anhydrous maleic acid.

* * * * *